Aug. 20, 1940.   G. L. N. MEYER   2,212,325
BEVERAGE MIXER
Filed Dec. 10, 1937   4 Sheets-Sheet 4

INVENTOR.
BY George L. N. Meyer
Eugene H. Simpson
ATTORNEY.

Patented Aug. 20, 1940

2,212,325

UNITED STATES PATENT OFFICE 2,212,325

BEVERAGE MIXER

George L. N. Meyer, Milwaukee, Wis.

Application December 10, 1937, Serial No. 179,072

11 Claims. (Cl. 259—54)

This invention relates to mixers and more particularly to a machine adapted to mix the syrup and water in a carbonated beverage.

In the preparation of carbonated beverages or soda waters such as root beer, the beverage is prepared by first putting a predetermined amount of syrup in the container and then filling the container with water which has been saturated with carbonic acid gas. The container is then capped, and agitated to mix the heavy syrup with the water. Too little agitation is likely to leave unmixed syrup in the bottom of the container, which would make the product less saleable, while too much agitation has a tendency to liberate the carbonic acid gas, and build up the pressure within the container to a point where weak containers are apt to burst.

One object of the present invention is to produce a machine which will thoroughly mix the ingredients of a carbonated beverage without agitating them enough to cause high internal pressure in the container.

A further object of the invention is to produce a machine which will invert the containers slowly and not agitate the contents unduly.

Another object is to produce a machine which will be continuous in its operation and which will handle a large number of containers.

Other objects are to improve the capacity of beverage mixers, reduce the cost of manufacture, operation and maintenance, and improve their efficiency.

Other objects will appear as the description progresses.

A structure embodying the invention is illustrated in the accompanying drawings and will be hereinafter fully described, the invention residing in certain novel features which will be particularly pointed out in the appended claims.

Figure 1:
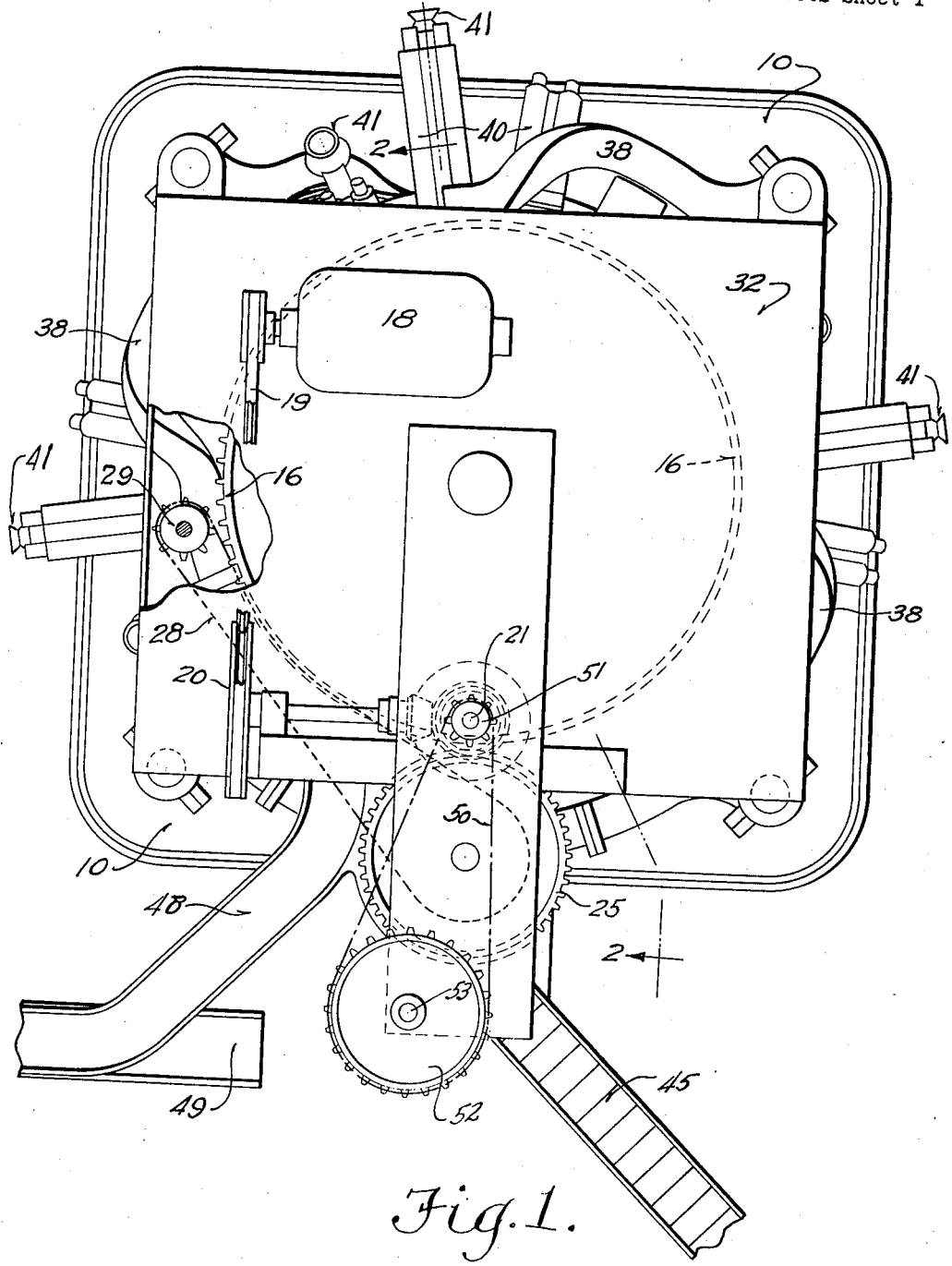
Fig. 1 is a top plan view of the beverage mixer, with certain parts being broken away to more clearly illustrate certain other parts.

In the drawings, in which like numerals indicate like parts throughout the several views, the machine is built on a base 10, which may be set on legs (not shown) to raise it to any convenient height.

A central standard 12 is mounted in the base and extends upwardly and terminates in a shaft or axis 13, which may be of reduced diameter.

A carrier wheel 14 is mounted on the shaft 13, with a bearing 15 interposed therebetween to absorb friction.

The carrier wheel 14 is turned on the shaft 13 by a sprocket wheel 16 which may be fixed to the hub 17 of the wheel 14 by any convenient means.

The sprocket wheel 16 is driven by a motor 18 through a V-belt 19, which drives a pulley 20, which drives a vertical shaft 21 through a pair of bevel gears 22—23. The shaft 21 drives a pinion 24 which is in mesh with a gear 25 which turns a shaft 26. The shaft 26 has a sprocket wheel 27 thereon which drives an endless chain 28. The chain 28 is mounted between the sprocket wheel 27 and a sprocket wheel 29 (Fig. 1) and engages the sprocket wheel 16 to rotate the sprocket wheel 16 and hence the carrier wheel 14.

The motor 18 is mounted on a platform 32 which is supported from the base 10 above the wheel 14 by a plurality of posts 33.

Figure 2:
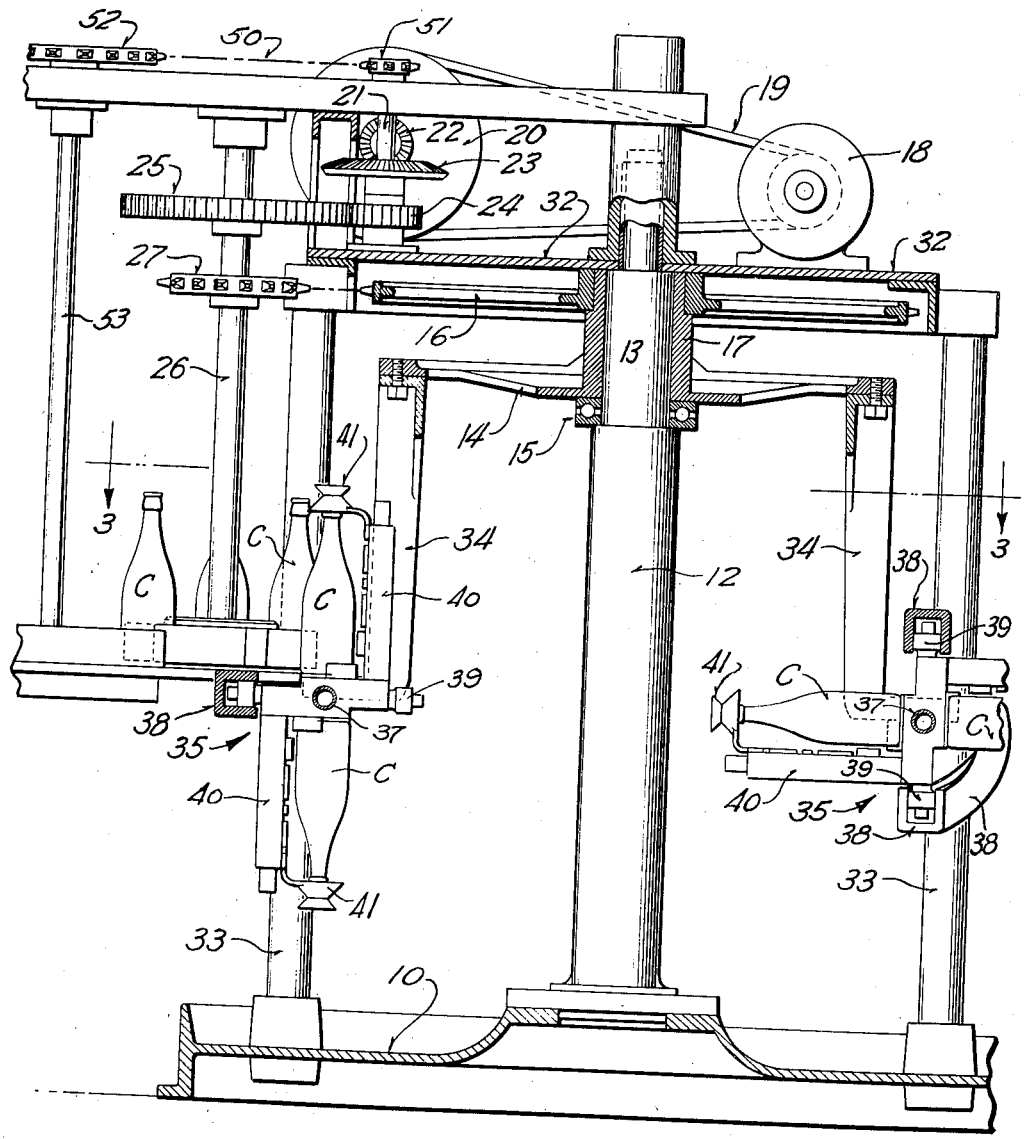
Fig. 2 is a cross-sectional elevational view of the machine taken on the line 2—2 of Figs. 1 and 3.
Figure 4:
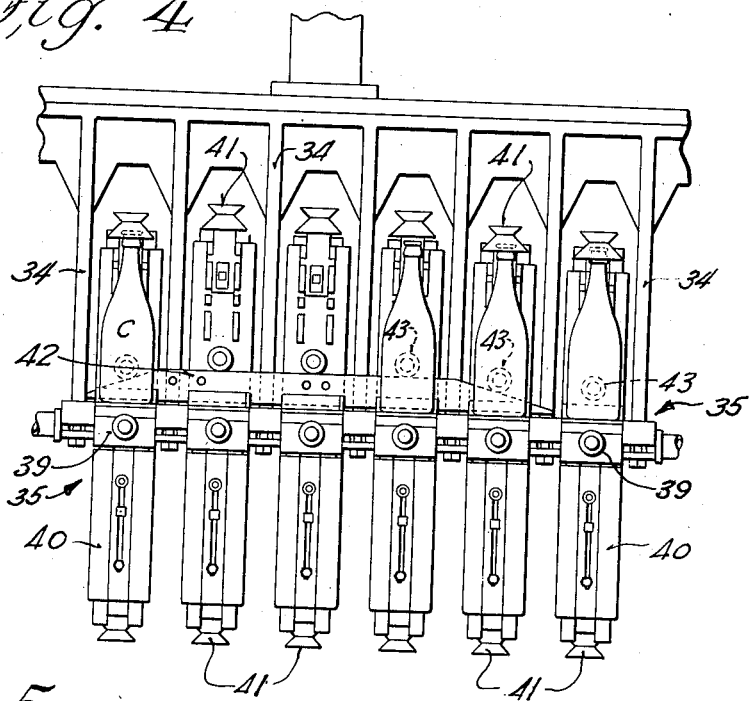
Fig. 4 is an elevational view of the load and discharge position of the containers, showing the operation of the loading cam.
Figure 5:
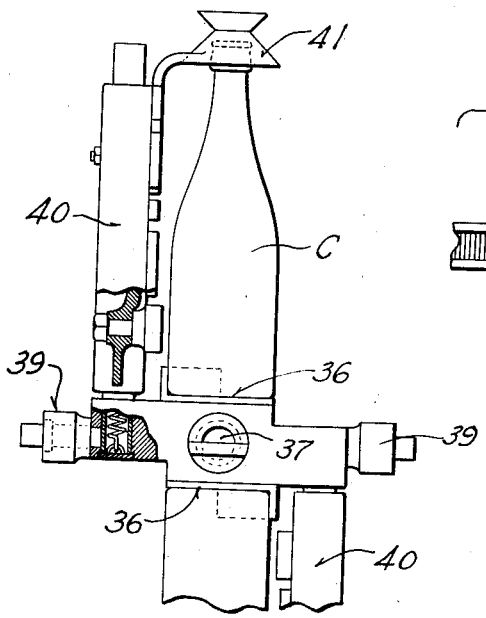
Fig. 5 is an enlarged side elevational view of the container carrier.
Figure 6:
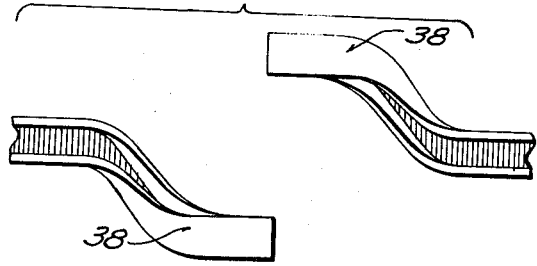
Fig. 6 is a fragmentary view of the inverting cams as seen from within the machine.

As best shown in Figs. 2 and 4, the carrier wheel 14 has a plurality of downwardly extending fingers 34, which receive container holders generally designated 35 therebetween. The container holders 35 are formed with opposed seats 36—36, best shown in Fig. 5, about which the holders pivot on axes 37 which are each transverse to the axis 13 of the wheel 14, so that as the carrier wheel 14 rotates about its axis, the container holders 35 may rotate about their axes.

Each holder 35 has a pair of spring urged container clamps 40, one extending perpendicularly and in opposite directions from each seat 36. The clamps have spring pressed cups 41 which engage over the container to clamp the container C on the seat 36, and are actuated by a cam 42 which operates followers 43 connected with the cups 41 to lift the cups at the load and unload positions or stations of the holders to permit the insertion or withdrawal of containers.

Figure 3:
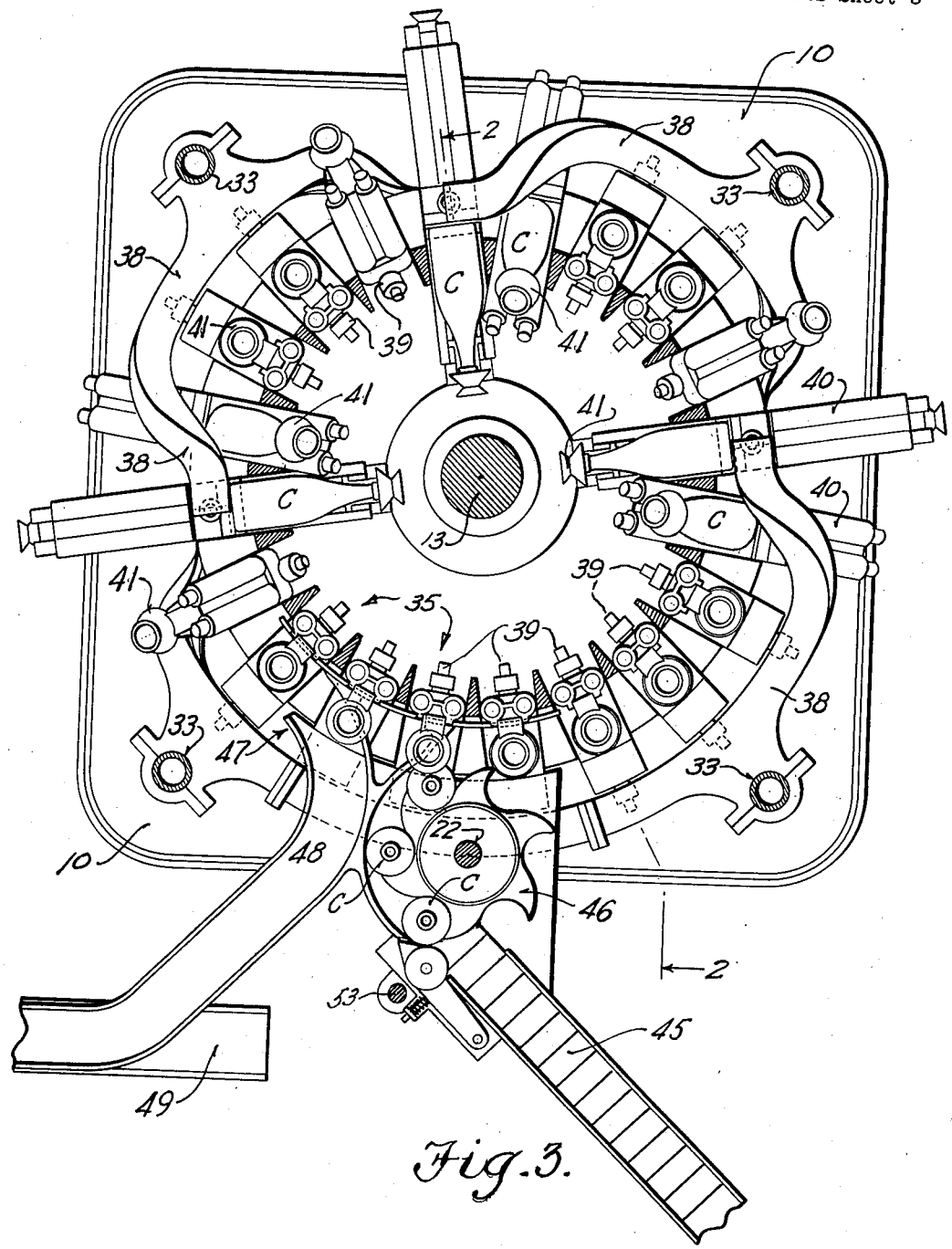
Fig. 3 is a horizontal cross-section on the line 3—3 of Fig. 2.

The containers C enter the machine at a loading position through a conveyor 45 (best shown in Fig. 3) which is driven by the motor 18 through a chain 50. The chain 50 is driven by a sprocket 51 fixed on the shaft 21, and drives a sprocket 52 which turns a shaft 53. The shaft 53 operates the conveyor 45 through a pair of bevel gears, not shown. The containers C are delivered by the conveyor to a star wheel 46 which is driven at synchronous speed with the carrier wheel 14 through the motor 18 and through the shaft 26 on which the star wheel is mounted. The star wheel is so designed as to deliver one container to each container holder as the latter passes the loading station.

As the container holders 35 approach the unload position, the cam 42 acts on the cam follower 43, lifting the container clamp 40 to permit the insertion or withdrawal of a container. The container clamp is maintained in raised position until the holder has passed the load position or station, at which time the cam permits the springs to become effective to lower the clamp onto the container C and retain the container on the seat 36.

The container holders 35 are rotated on their axes 37 by cams 38. The cams 38 are each mounted on the posts 33 and are arranged substantially on the outside of the carrier 14.

As the container leaves the loading position a cam 38, fixed on one of the posts 33, is in engagement with a cam follower 39 which is on the container holder 35. As the carrier wheel 14 rotates about its axis 13 the cam 38 acts on the follower 39 to rotate the holder and bring the container C to a horizontal position. At this point a second cam follower on the opposite side of the container holder from the first mentioned follower engages a second cam 38, fixed on the next successive post 33, which continues to revolve the container holder about its axis 37 as the carrier 14 revolves about the axis 13. Similarly, after 180° of rotation of the holder 35 about its axis 37 a third cam 38 engages the free follower 39 to rotate the container holder and container through an additional 180°. A fourth cam 38 engages one of the followers 39 to bring the container on the holder to an inverted position opposite the unloading station 47. The container is maintained in this inverted position by a dwell, or horizontal portion in the cam 38, until the container holder has passed the loading station at which point the cycle just described again commences.

Each container, therefore, makes two revolutions with the carrier wheel 14, and in the machine shown, is turned end over end three times. It will also be noted that the container, at the end of its first revolution with the carrier 14, passes under both the unload and load stations in inverted position, and that on the second revolution of the carrier 14, the container C reaches the unload station 47 in upright position and is discharged onto the shelf 48. The containers upon passing the discharge position are shoved onto the shelf 48 by the holders 35, and are pushed along the shelf 48 onto the conveyor 49 by pressure of subsequent containers discharging from the holders.

It is to be understood, however, that the above operation is not to be construed, as the only possible means of operating the machine, nor is the machine, hereinabove described as the preferred form, to be considered as the only machine which may fall within the terms of the present invention. It is obvious that the holders can be made to rotate through any angle which is an odd multiple of 180° between the load and the unload position and between the load and the load position. For example, the container holder might rotate through 540° (3×180°) between the load and the unload position and rotate 900° (5×180°) for one complete rotation of the carrier wheel 14. Other changes in the form and arrangement of parts can be made as will fall within the terms of the appended claims.

Having thus described the invention it is hereby claimed as follows:

1. A beverage mixer of the character described comprising, a base, a carrier revolvably mounted on an axis on said base, a platform above said carrier, drive means mounted on said platform, means to support said platform from said base, a plurality of container holders revolvably mounted on said carrier on axes perpendicular to the axis thereof, a cam mounted on the platform supporting means, a cam follower carried by each of said container holders and engageable with said cams to rotate the holders about their axes as the carrier rotates about its axis, means driven from said drive means to rotate for the carrier, means to deliver containers onto said holders, and means to receive containers from said holders.

2. A beverage mixer of the character described comprising, a base, a carrier revolvably mounted on an axis on said base, a plurality of container holders pivotally mounted on said carrier about axes substantially perpendicular to the axis of said carrier, a plurality of container clamps extending in opposite directions from the opposite sides of each holder, a loading station adjacent said holders, an unloading station adjacent said holders, and means to rotate each container holder through an odd multiple of 180° as the carrier rotates the holder between the load and the unload stations and for one revolution of the carrier.

3. A beverage mixer as defined in claim 2 in which the last named means comprises a cam supported from said base and cam followers carried by said holders.

4. A beverage mixer of the character described comprising, a base, a carrier wheel revolvably mounted on an axis on said base, means to rotate said carrier about said axis, a plurality of container holders mounted on said carrier, each of said holders being independently mounted on a pivot tangential to the path of rotation of the carrier wheel, means to rotate the holders about their pivots as the carrier rotates about its axis, and means to effect loading on each holder on alternate revolutions of said carrier.

5. A beverage mixer of the character described comprising, a base, an axis mounted in said base, a carrier wheel revolvably mounted on said axis, a plurality of pivots mounted tangential to said carrier wheel, a plurality of container holders rotatably mounted on each of said pivots, means to load containers onto said holders at one position on alternate revolutions of the carrier wheel, means to unload the containers from said holders at another position and on alternate revolutions of the carrier wheel, and means to rotate the container holders about their pivots as the carrier wheel rotates about its axis, with a dwell adjacent both the loading and unloading positions.

6. A beverage mixer of the character described comprising, a base, a carrier wheel revolvably mounted from said base on an axis, a loading station mounted from said base, a pivot mounted from and substantially tangential to said carrier wheel, a plurality of container holders revolvably mounted on said pivot, each of said holders comprising a base and a container clamp connected with each of said bases, said container holders being revolvable on said pivot to a position adjacent said loading station, means to rotate said carrier wheel and said container holders about said axis and means to simultaneously rotate said holders about said pivot to bring successive holders opposite the loading station on successive revolutions of the wheel about the axis.

7. A beverage mixer of the character described comprising, a base, a carrier wheel revolvably mounted from said base on an axis, a loading station mounted from said base, a star wheel rotatably mounted at said loading station, a pivot mounted from and substantially tangential to said carrier wheel, a plurality of container holders revolvably mounted on said pivot, each of said holders comprising a base and a container clamp connected with each of said bases, said container holders being revolvable on said pivot to a position adjacent said loading station, means to rotate said carrier wheel and said container holders about said axis, means to simultaneously rotate said holders about said pivot to bring successive holders opposite the loading station on successive revolutions of the wheel about the axis, and means to rotate said star wheel synchronously with said carrier wheel to deliver containers to said holders.

8. A beverage mixer of the character described comprising, a base, a carrier wheel revolvably mounted from said base on an axis, a loading station mounted from said base, an unloading station mounted from said base, a pivot mounted from and substantially tangential to said carrier wheel, a plurality of container holders revolvably mounted on said pivot, each of said container holders being revolvable to a loading position adjacent said loading station and to an unloading position adjacent said unloading station, means to load containers from said loading station onto said holders in sequence on successive revolutions of said carrier wheel, and means to unload said containers in the same sequence at said unloading station.

9. A beverage mixer of the character described comprising, a base, a carrier wheel revolvably mounted from said base on an axis, a loading station mounted from said base, a star wheel rotatably mounted at said loading station, an unloading station mounted from said base, a pivot mounted from and substantially tangential to said carrier wheel, a plurality of container holders revolvably mounted on said pivot, each of said holders being revolvable to a loading position adjacent said loading station and to an unloading position adjacent said unloading station, means to rotate said carrier wheel and said container holders about said axis, means to simultaneously rotate said container holders about said pivot, means to rotate said star wheel to load containers onto said holders in sequence on successive revolutions of said carrier wheel about said axis, and means at said unloading station to unload containers from said holders in the same sequence.

10. A beverage mixer of the character described comprising, a base, a carrier wheel revolvably mounted from said base on an axis, a loading station mounted from said base, an unloading station mounted from said base, a pivot mounted from and substantially tangential to said carrier wheel, a plurality of container holders mounted radially about said pivot and revolvable thereon, a cam follower mounted on said holders, each of said holders being revolvable to a loading position adjacent said loading station and to an unloading position adjacent said unloading station, a cam element mounted from said base and engageable by said cam follower to revolve said holders about said pivot as said carrier wheel revolves about said axis, means to rotate said carrier wheel about said axis whereby said holders are rotated about said pivot, means to load containers from said loading station onto said holders in sequence and means at said unloading station to unload containers from said holders in the same sequence.

11. A beverage mixer of the character described comprising, a base, a carrier wheel revolvably mounted from said base on an axis, a loading station mounted from said base, a star wheel rotatably mounted at said loading station, an unloading station mounted from said base, a pivot mounted from and substantially tangential to said carrier wheel, a plurality of container holders mounted radially about said pivot and revolvable thereon, a cam follower mounted on said holders, each of said holders being revolvable to a loading position adjacent said loading station and to an unloading position adjacent said unloading station, a cam element mounted from said base and engageable by said cam follower to revolve said holders about said pivot as said carrier wheel revolves about said axis, means to rotate said carrier wheel about said axis whereby said holders are rotated about said pivot, means to rotate said star wheel to load containers onto said holders in sequence, and means at said unloading station to unload containers from said holders in the same sequence.

GEORGE L. N. MEYER.